United States Patent [19]

Fukui et al.

[11] Patent Number: 4,879,611

[45] Date of Patent: Nov. 7, 1989

[54] RECORD MODE SETTING APPARATUS RESPONSIVE TO TRANSMITTED CODE CONTAINING TIME-START INFORMATION

[75] Inventors: Kumiko Fukui, Shijonawate; Tatsuaki Doumura, Higashiosaka; Shigeo Okamoto, Ikoma, all of Japan

[73] Assignee: Sanyo Electric Co., Ltd., Osaka, Japan

[21] Appl. No.: 79,745

[22] Filed: Jul. 30, 1987

[30] Foreign Application Priority Data

Aug. 1, 1986 [JP] Japan ................................ 61-182513
Aug. 20, 1986 [JP] Japan ................................ 61-194517

[51] Int. Cl.[4] .......................... G11B 15/18; G11B 5/02
[52] U.S. Cl. ..................................... 360/69; 360/33.1; 360/27; 369/7; 358/335; 358/908
[58] Field of Search ................. 360/27, 74.1, 69, 33.1; 369/7; 358/335, 908

[56] References Cited

U.S. PATENT DOCUMENTS 4,305,101 12/1981 Yarbrough et al. ................... 360/69
4,439,785 3/1981 Leonard .............................. 360/33.1
4,750,052 6/1988 Poppy et al. ........................... 360/69

FOREIGN PATENT DOCUMENTS 2403005 1/1974 Fed. Rep. of Germany ........ 360/69
55-170877 6/1982 Japan ..................................... 360/69

Primary Examiner—Alan Faber
Assistant Examiner—Kevin J. Fournier
Attorney, Agent, or Firm—Armstrong, Nikaido, Marmelstein & Kubovcik

[57] ABSTRACT

The record mode setting apparatus comprises a VPS setting switch (41), a VPS decoder (3), a code latch circuit (7), a VPS control circuit (26) and a code memory (27). When the VPS setting switch (41) is turned on while a recording means (16) is ready for recording, the VPS decoder (3) detects a VPS code out of a video signal and the VPS code is stored in the code memory (27). Thereafter, the VPS code detected by the VPS decoder (3) is applied to the code latch circuit (7). The VPS control circuit (26) compares the VPS code of the code latch circuit (7) with the VPS code stored in the code memory (27) and stops the recording means (16) when both do not coincide with each other.

5 Claims, 2 Drawing Sheets

RECORD MODE SETTING APPARATUS RESPONSIVE TO TRANSMITTED CODE CONTAINING TIME-START INFORMATION

BACKGROUND OF THE INVENTION

1. Field of the Invention

The present invention relates to a record mode setting apparatus for controlling a program recording operation by automatically actuating a recording means in response to a VPS code multiplexed on a broadcasting signal.

2. Description of the Prior Art

In West Germany, a program presetting system referred to as a VPS (video program system) has been widely used in a video tape recorder. The VPS is adapted such that timer recording of the video tape recorder can be controlled on the side of a broadcasting station when the broadcasting station superposes on a video signal a digitized code (VPS code) for identifying a program and broadcasts the same. The VPS is disclosed in detail in German Patent Laying-Open Gazette Nos. 2950432, 3243610 and the like.

Referring now to FIG. 1, description is made on an example of a conventional record mode setting apparatus using such a VPS.

Preset program information is input to a preset program storing circuit 6 by operation of a program preset button group 4. The preset program storing circuit 6 stores the preset program information as a preset program code and provides the same to display means 9, so that the display means displays the information. The preset program code includes a starting time code concerning the starting time point of recording, a channel code concerning a preset program channel, and an ending time code concerning the ending time point of recording (or a recording time period). The preset program storing circuit 6 also stores the set state of a VPS setting switch 5 for selecting a program preset mode. The program preset mode is set to a VPS program preset mode by turning the VPS setting switch 5 on and set to a normal program preset mode by turning the VPS setting switch 5 off. In the VPS program preset mode, a program is recorded in response to a VPS code multiplexed on a video signal independently of the starting time of recording and the ending time of recording as represented by the preset program code. In the normal program preset mode, the program is recorded from the starting time of recording to the ending time of recording in accordance with the actual time. The VPS code includes at least a program code showing the predicted starting time of a program.

In the VPS program preset mode, a before-three hours determining circuit 13 compares real-time information output from a clock circuit 11 with the starting time code stored in the preset program storing circuit 6 and starts operating a second power supply circuit 15 three hours, for example, before the starting time recording. Thus, a tuner 2 is driven. A channel selecting circuit 12 inputs a channel code stored in the preset program storing circuit 6 and applies a corresponding tuning voltage to the tuner 2. Thus, the tuner 2 selects a video signal corresponding to a preset program channel from a broadcasting signal obtained by an antenna 1 and applies the video signal to a VPS decoder 3. As a result, the VPS decoder 3 starts decoding the VPS code three hours before the starting time of recording and continues to send the same to a code latch circuit 7.

A preset program coincidence determining circuit 8 compares a program code included in the VPS code stored in the code latch circuit 7 with the starting time code stored in the preset program storing circuit 6 and outputs a coincidence signal when both coincide with each other. A timer control circuit 10 operates a first power supply circuit 14 in response to the coincidence signal. Thus, recording means 16 is driven by the power supply 14, so that recording of the video signal output from the tuner 2 is started. The recording is performed during a time period when the program code included in the above described VPS code continue to coincide with the starting time code included in the preset program code. Meanwhile, if the above described program code is changed to a code indicating interruption of the program (program interruption code), only the above described first power supply circuit 14 is not operated while the program interruption code is being produced. When the program during recording is ended, the program code included in the VPS code is changed, so that the coincidence signal is not output from the preset program coincidence determining circuit 8, resulting in ending of recording. Thus, in the VPS program preset mode, if the time for a desired program is changed and the time for a program is extended, the program can be surely recorded.

On the other hand, if the VPS code is not multiplexed on the video signal, the VPS code is not stored in the above described code latch circuit 7. When the preset program coincidence determining circuit 8 determines that the VPS code is not stored in the code latch circuit 7, recording is performed in the normal program preset mode.

In the normal program preset mode, the preset program coincidence determining circuit 8 compares the real-time information output from the clock circuit 11 with the starting time code stored in the preset program storing circuit 6 and outputs the coincidence signal when both coincide with each other. The timer control circuit 10 operates the first power supply circuit 14 and the second power supply circuit 15 in response to the coincidence signal. As a result, at the starting time of recording, recording is started. After recording is started, the preset program coincidence determining circuit 8 compares the real-time information output from the clock circuit 11 with the ending time code stored in the preset program storing circuit 6 and outputs the coincidence signal when both coincide with each other. The timer control circuit 10 stops operation of the first power supply circuit 14 and the second power supply circuit 15 in response to the coincidence signal and ends recording by recording means 16. Even if the VPS code is multiplexed on the video signal corresponding to the preset program channel, recording is performed in the above described normal program preset mode irrespective of the contents stored in the code latch circuit 7 if the VPS setting switch 5 is set to the off state at the time of program presetting operation.

In FIG. 1, the portion 20 enclosed by a broken line is structured by a microcomputer.

A video tape recorder comprising the above described record mode setting apparatus can perform not only the above described normal preset program recording but also manual recording.

The above described conventional record mode setting apparatus can not control recording based on the VPS code in the case of recording by normal manual operation, so that a user can not surely record a desired program if a user does not continue to monitor the program until the program is ended.

SUMMARY OF THE INVENTION

A primary object of the present invention is to provide a record mode setting apparatus capable of performing recording based on a VPS code even in the case of recording by manual operation.

In accordance with the broadest aspect of the present invention, it is directed to the record mode control device for use in a video tape recorder, which controls operation of recording devices in response to a VPS code multiplexed on a broadcasting signal, and records only a single program having a VPS code which is identical to the VPS code multiplexed on the broadcasting signal. The video tape recorder comprises a tuner for detecting from a broadcasting signal a video signal which may include a VPS code indicating at least the scheduled starting time of a program, a recording device for recording the video signal detected by the tuner, and a record switch device for setting the recording device to be ready for operating. The record mode setting apparatus comprises a VPS code deriving device for deriving the VPS code from a video signal detected by the tuner, a VPS setting switch device for commanding a recording based on a VPS, a storing device responsive to operation of the VPS setting switch device for storing the VPS code derived from the VPS code deriving device, and a VPS control device for comparing the VPS code derived from the VPS code deriving device with an output from the storing device and responsive to the result of a comparison for generating a control signal for controlling operation of the recording device which is ready for operating by operation of the record switch.

In accordance with a preferred embodiment of the present invention, the record mode setting apparatus further comprises VPS mode setting device for detecting that both the record switch device and the VPS setting switch device are operated and making the VPS control device ready for operating.

In accordance with another preferred embodiment of the present invention, the record mode setting apparatus further comprises an inverting switch device and VPS mode switching device, said VPS mode switching device preventing the control signal from being supplied from the VPS control device to the recording device in response to operation of the inverting switch.

In accordance with another aspect of the present invention, it is directed to a record mode setting apparatus for use in a video tape recorder which comprises a tuner for detecting from a broadcasting signal a video signal which may include a VPS code indicating at least scheduled starting time of a program, a recording device for recording the video signal detected by the signal, a timer record switch device for setting the recording device to be ready for operating and setting the recording time period, and a timer device for determining the recording time period set by the timer record switch device and generating a signal for stopping recording by the recording device after a lapse of the recording time period. The record mode setting apparatus comprises VPS code deriving device for deriving the VPS code from the video signal detected by the tuner, a storing device responsive to operation of the timer record switch device for storing the VPS code derived from the VPS code deriving device, VPS control device for comparing the VPS code derived from the code deriving device with an output from the storing device, and responsive to the result of comparison for generating a control signal for controlling operation of the recording device which is ready for operating by operation of the timer record switch, and VPS mode switching device for applying a control signal from the VPS control device to the recording device, the control signal dominating an output from the timer device.

An advantage of the record mode setting apparatus according to the present invention is that recording based on the VPS code is possible even in the case of recording by manual operation, and a desired program can be precisely recorded even if the program does not continue to be monitored during recording.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
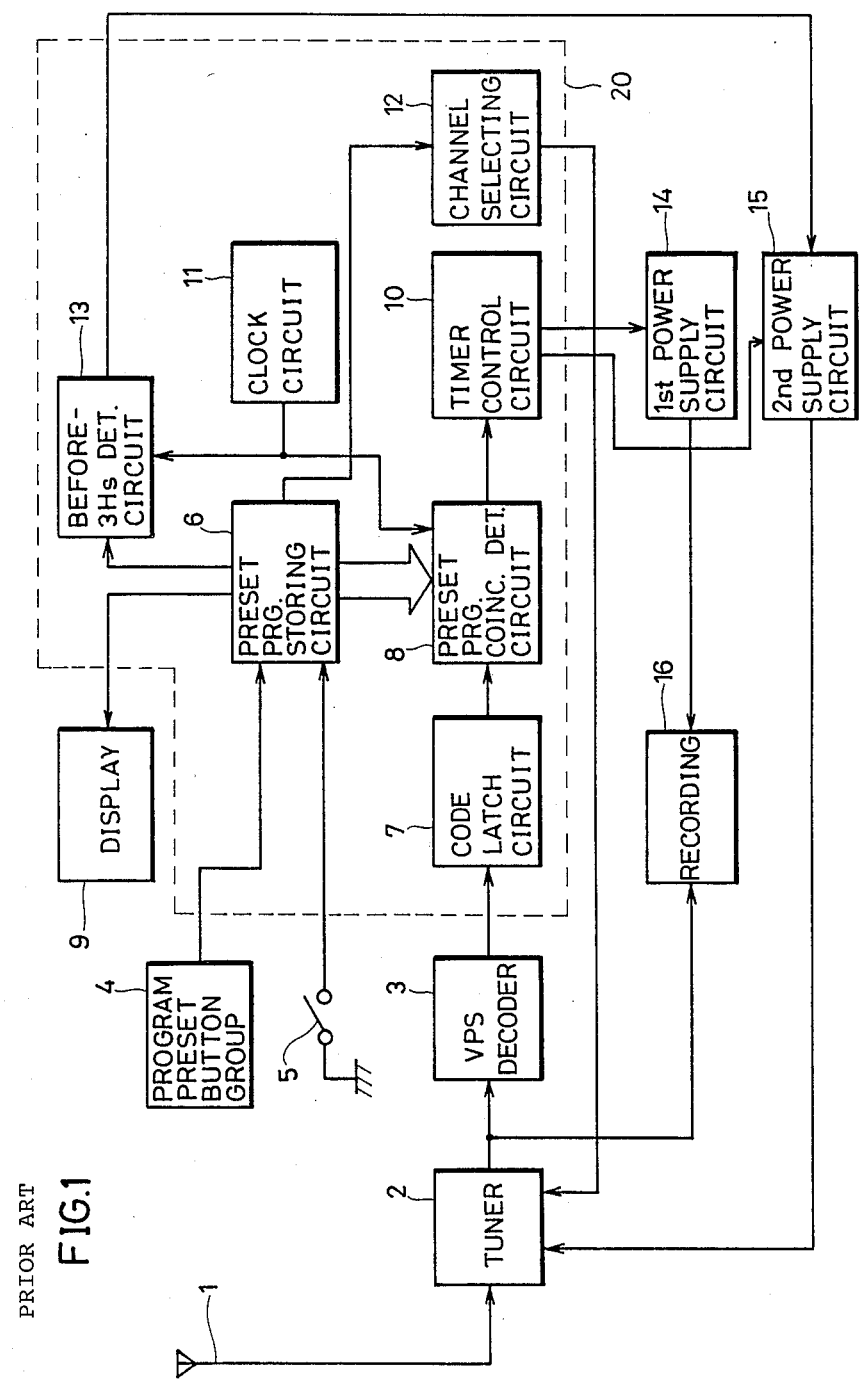
FIG. 1 is a block diagram showing a conventional record mode setting apparatus.
Figure 2:
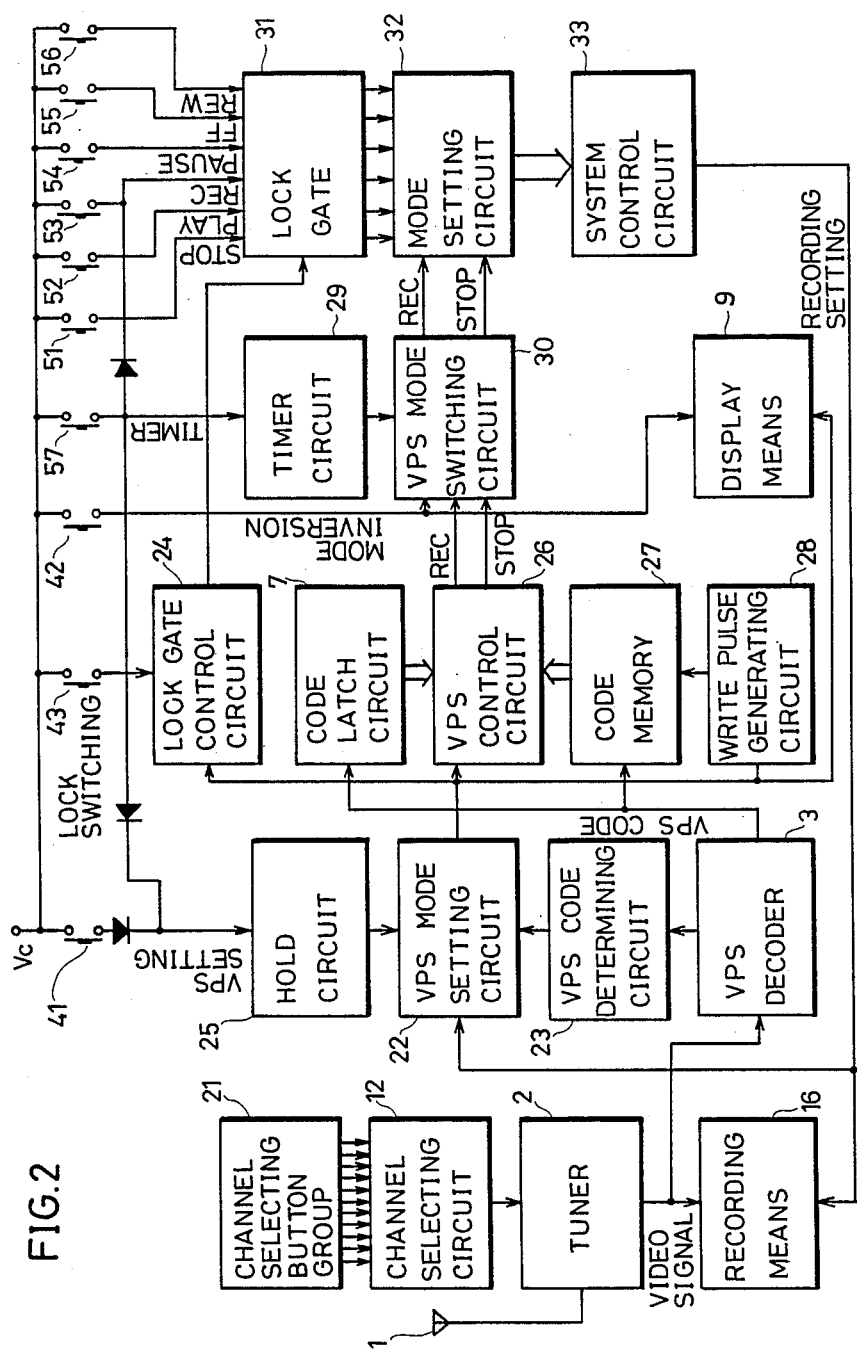
FIG. 2 is a block diagram showing a main portion, that is, a portion for recording by a normal record mode and a VPS record mode, of a record mode setting apparatus according to an embodiment of the present invention.
Figure 3:
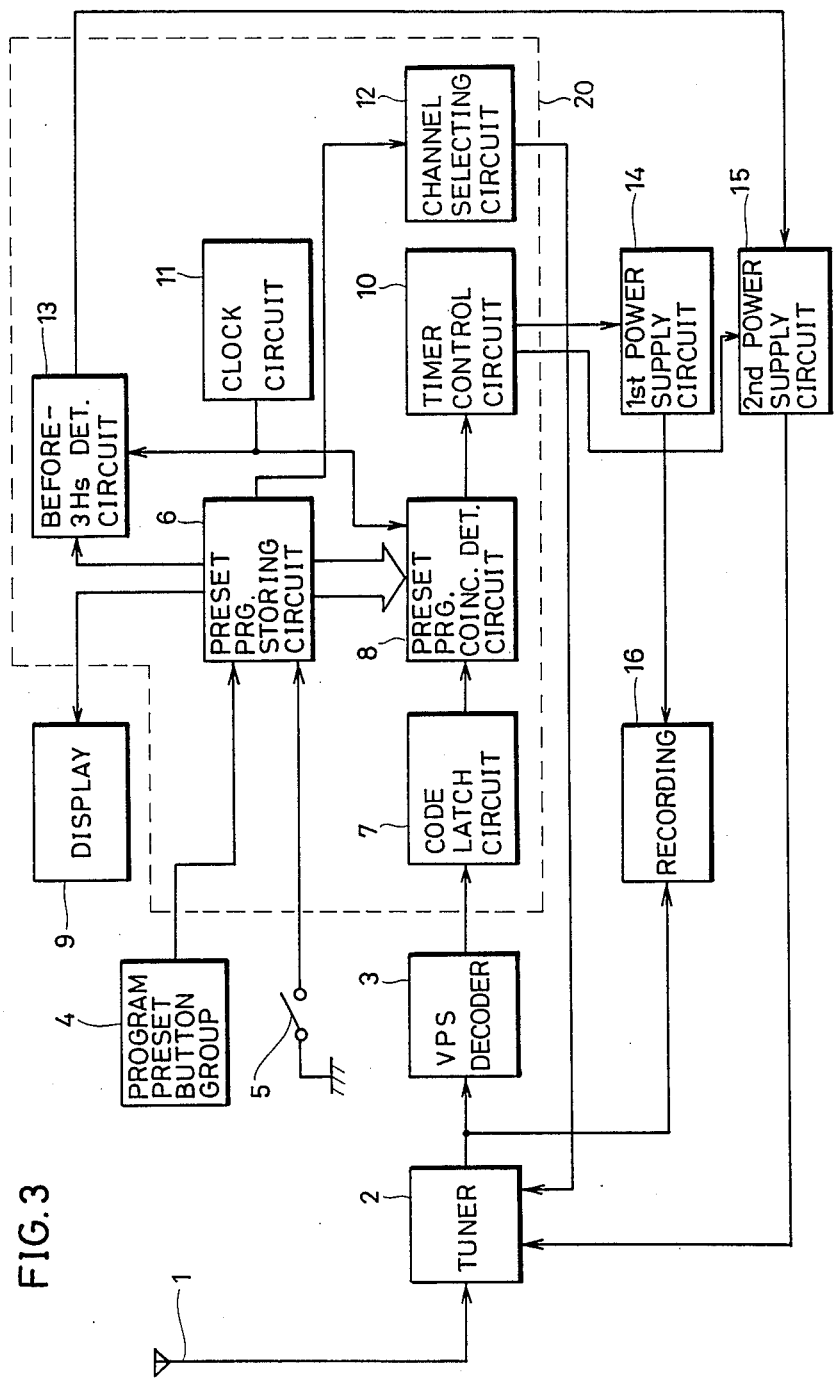

FIG. 2 is a block diagram showing a record mode setting apparatus according to an embodiment of the present invention. The record mode setting apparatus can perform recording by manual operation and preset program recording. A portion for performing recording by manual operation is shown in FIG. 2, and a portion for performing preset program recording is shown in FIG. 1. In FIGS. 2 and 1, portions appended by the identical reference numerals indicate the identical portions.

Recording by manual operation is performed in either a normal record mode or a VPS record mode, and preset program recording is performed in either a normal program preset mode or a VPS program preset mode.

Since a structure and operation was described in FIG. 1, description is now made on a structure and operation of the portions shown in FIG. 2. However, many components shown in FIG. 2 are achieved by software from a microcomputer.

When a predetermined channel is selected by operation of a channel selecting button group 21, a channel selecting circuit 12 applies a tuning voltage corresponding to the channel to a tuner 2. As a result, the tuner 2 selects a video signal corresponding to the above described channel from a broadcasting signal obtained by an antenna 1 and applies the video signal to recording means 16.

When a record switch 53 is turned on, an output from the record switch 53 is stored in a mode setting circuit 32 through a lock gate 31 as a record command signal. As a result, a system control circuit 33 applies a recording set signal to the recording means 16, so that the recording means 16 records the video signal applied from the tuner 2 in a normal record mode. Such operation has been conventionally well-known. The present embodiment is characterized as follows.

In the present embodiment, the video signal obtained by the tuner 2 is also applied to a VPS decoder 3. The VPS decoder 3 derives a VPS signal from the video signal and detects a VPS code from it and applies the VPS code to a VPS code determining circuit 23, a code latch circuit 7 and a code memory 27. The VPS code determining circuit 23 determines whether or not the VPS code is multiplexed on the video signal and applies a code detection signal to a VPS mode setting circuit 22 if the VPS code is applied from the VPS decoder 3. More specifically, when a channel in which the VPS code is not multiplexed on the video signal is selected, the VPS code determining circuit 23 does not generate the code detection signal.

When a VPS setting switch 41 which is normally opened is closed, an output from the VPS setting switch 41 is applied to a holding circuit 25 as a VPS set signal. The holding circuit 25 holds the VPS set signal during a constant time period, and an output from the holding circuit 25 is applied to the VPS mode setting circuit 22. If the recording set signal from the system control circuit 33 and the code detection signal from the VPS code determining circuit 23 are generated while an output from the above described holding circuit 25 is produced, the VPS mode setting circuit 22 outputs a VPS recording set signal. More specifically, when the recording means 16 is ready for recording and the VPS code is multiplexed on the video signal after operation of the VPS setting switch 41 or within a constant time period after operation thereof, the VPS mode setting circuit 22 determines that a VPS record mode can be set and generates the VPS recording set signal in response to setting of the VPS setting switch 41. Therefore, if the record switch 53 is operated within a holding time period of the VPS set signal after operation of the VPS setting switch 41, VPS recording can be set. The VPS recording set signal is applied to a lock gate control circuit 24, a VPS control circuit 26, a write pulse generating circuit 28 and display means 9. The lock gate control circuit 24 applies a lock control signal to the lock gate 31 in response to the VPS recording set signal. As a result, the lock gate 31 prevents subsequent passage of a command signal from each of operation switches 51 to 57 and makes manual control of the recording means 16 impossible. In addition, the write pulse generating circuit 28 generates a write pulse in response to the above described VPS recording set signal. The code memory 27 stores the VPS code detected by the VPS decoder 3 in response to the write pulse. More specifically, the code memory 27 stores the VPS code at the time of VPS setting operation. Furthermore, the display means 9 displays an indication that a record mode is set to the VPS record mode in response to the above described VPS recording set signal.

Thereafter, by setting the VPS record mode, a code latch circuit 7 repeats latching operation of the VPS code detected by the VPS decoder 3. The VPS control circuit 26 compares the VPS code latched by the code latch circuit 7 with the VPS code stored in the code memory 27, and applies a signal based on the result of comparison to the mode setting circuit 32 through a VPS mode switching circuit 30. When the VPS code latched by the code latch circuit 7 is changed from a program code to a program interruption code, the VPS control circuit 26 outputs a stop command signal. The mode setting circuit 32 commands the system control circuit 33 to stop the recording means 16 in response to the stop command signal. Thus, the system control circuit 33 makes the recording means 16 ready for stopping. When the VPS code latched by the code latch circuit 7 is changed again to the original program code, the VPS control circuit 26 outputs a recording command signal, so that the recording means 16 is ready for recording again. In addition, when the VPS code latched by the code latch circuit 7 is changed to a different program code from the VPS code stored in the code memory 27, the VPS control circuit 26 outputs a recording ending command signal. The mode setting circuit 32 commands the system control circuit 33 to end recording operation of the recording means 16 in response to the recording ending command signal. Therefore, the system control circuit 33 ends recording operation by the recording means 16.

The record mode is changed from the VPS record mode to the normal record mode by operation of the record mode inverting switch 42. Therefore, a signal applied to the VPS mode switching circuit 30 from the VPS control circuit 26 is not transmitted to the mode setting circuit 32, and the locked state of the lock gate 31 is released by the lock gate control circuit 24. Thus, manual operation of the recording means 16 by a stop switch 51, a playback switch 52, the record switch 53, a pause switch 54, a fast forward switch 55 and a rewind switch 56 becomes possible. When the above described record mode inverting switch 42 is operated again, the record mode is changed again from the normal record mode to the VPS record mode, so that recording in the VPS record mode is performed. The change of the record mode is displayed by the display means 9.

Furthermore, the lock gate control circuit 24 is controlled by operation of a lock switching switch 43 which is normally opened. In the VPS record mode, when the lock switching switch 43 is depressed, the lock control signal output from the lock gate control circuit 24 is not output, so that the locked state of the lock gate 31 is released. Therefore, the recording means 16 can be controlled by operation of the operating switches 51 to 57. Thus, if and when it is not desired to record a commercial or the like during recording in the VPS record mode, the lock switching switch 43 is operated and then, the pause switch 54 is operated so that recording can be interrupted. The lock gate 31 becomes to be in the original locked state by operating again the lock switching switch 43. The locked state and the unlocked state are inverted every time the lock switching switch 43 is operated. In addition, the state of the lock gate 31 is displayed by the display means 9. Meanwhile, the record mode inverting switch 42 need not necessarily by separately provided. It is needless to say that the VPS setting switch 41 may be provided with, for example, a decoder so that the VPS mode switching circuit 30 and the display means 9 are controlled every time the VPS setting switch 41 is operated by the decoder.

Furthermore, in the record mode control device, recording by a one-touch timer switch 57 is possible. When the one-touch timer switch 57 is depressed, the recording time period is stored in a timer circuit 29 in accordance with the number of times of the depression. In the present embodiment, the VPS record mode is automatically set by depressing the one-touch timer switch 57, the VPS set signal is applied from the one-touch timer switch 57 to the VPS mode setting circuit 22, so that recording is started in the VPS record mode in the same manner as when the VPS setting switch 41 is depressed. In the VPS record mode, when the one-touch timer switch 57 is operated, the VPS code detected by the VPS decoder 3 is stored in the code memory 27. Thereafter, the VPS code applied to the code latch circuit 7 from the VPS decoder 3 are compared with the VPS code stored in the code memory 27. When the VPS code applied to the code latch circuit 7 does not coincide with the VPS code stored in the code memory 27 irrespective of the recording time period set by the one-touch timer switch 57, recording is ended. Meanwhile, a ten key may be provided so that the recording time period is set to the timer circuit 29 by operation of the ten key and counting operation of the timer circuit 29 is started by operation of the one-touch timer switch 57. In this case, the VPS record mode is changed to the normal record mode by operation of the record mode inverting switch 42. In the normal record mode, when the one-touch timer switch 57 is depressed, recording by the recording means 16 is started at once, and the recording time period set by the timer circuit 29 is decreased. As a result, when the recording time period set by the timer circuit 29 elapses, that is, is decreased to zero, the recording ending command signal is output from the timer circuit 29, and recording by the recording means 16 is ended by the recording ending command signal.

Although in the present embodiment, the lock gate 31 is locked or disconnected in the initial state immediately after the VPS recording set signal is generated from the VPS mode setting circuit 22, the lock gate 31 may pass signals from the operation switches 51 to 57 in the initial state. In this case, so long as the lock switching switch 43 is not operated, the recording means 16 can be manually controlled.

Furthermore, if and when it is not necessary to prevent manual control of the recording means 16 during recording in the VPS record mode, the lock switching switch 43, the lock gate control circuit 24 and the lock gate 31 may be omitted.

Additionally, during VPS recoding, the locked states of only signals from the pause switch 54 or only signals from the pause switch 54 and the stop switch 51 may be released by operation of the lock switching switch 43. In this case, only operation for cutting a record such as a commercial becomes possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A record mode setting apparatus for use in a video tape recorder, said video tape recorder including a tuner for detecting from a broadcasting signal a video signal which may include a VPS code indicating at least scheduled starting time of a program, recording means for recording the video signal detected by said tuner, and recording switch means for setting said recording means to be ready for operating, said record mode setting apparatus comprising:

VPS code deriving means for deriving the VPS code from a video signal detected by said tuner;
VPS setting switch means for setting a recording based on a VPS;
storing means responsive to operation of said VPS setting switch means for storing the VPS code derived from said VPS code deriving means; and
VPS control means for comparing the VPS code derived from said VPS code deriving means with an output from said storing means and being responsive to the result of the comparison for generating a control signal for controlling operation of said recording means which is ready for operating by operation of said record switch.

2. A record mode setting apparatus in accordance with claim 1, further comprising VPS mode setting means for detecting that both said record switch means and said VPS setting switch means are operated and making said VPS control means ready for operating.

3. A record mode setting apparatus in accordance with of claim 1, further comprising an inverting switch means and VPS mode switching means,
said VPS mode switching means preventing said control signal from being supplied from said VPS control means to said recording means in response to operation of said inverting switch.

4. A record mode setting apparatus in accordance with of claim 2, further comprising an inverting switch means and VPS mode switching means,
said VPS mode switching means preventing said control signal from being supplied from said VPS control means to said recording means in response to operation of said inverting switch.

5. A record mode setting apparatus for use in a video tape recorder, said video tape recorder including a tuner for detecting from a broadcasting signal a video signal which may include a VPS code indicating at least scheduled starting time of a program, a recording means for recording the video signal detected by said signal, a timer record switch means for setting said recording means to be ready for operating and setting the recording time period, and a timer means for determining the recording time period set by said timer record switch means and generating a signal for stopping recording by said recording means after a lapse of said recording time period, said record mode setting apparatus comprising:

VPS code deriving means for deriving the VPS code from the video signal detected by said tuner;
storing means responsive to operation of said timer record switch means for storing the VPS code derived from said VPS code deriving means;
VPS control means for comparing the VPS code derived from said VPS code deriving means with an output from said storing means and being responsive to the result of comparison for generating a control signal for controlling operation of said recording means which is ready for operating by operation of said timer record switch; and
VPS mode switching means for applying a control signal from said VPS control means to said recording means, said control signal overriding an output from said timer means.

* * * * *